April 27, 1937.  A. L. PACE  2,078,507
GRATER
Filed Oct. 18, 1935  3 Sheets-Sheet 1

Inventor
A. L. Pace
By CASnow&Co.
Attorneys.

April 27, 1937.　　　A. L. PACE　　　2,078,507
GRATER
Filed Oct. 18, 1935　　　3 Sheets-Sheet 3
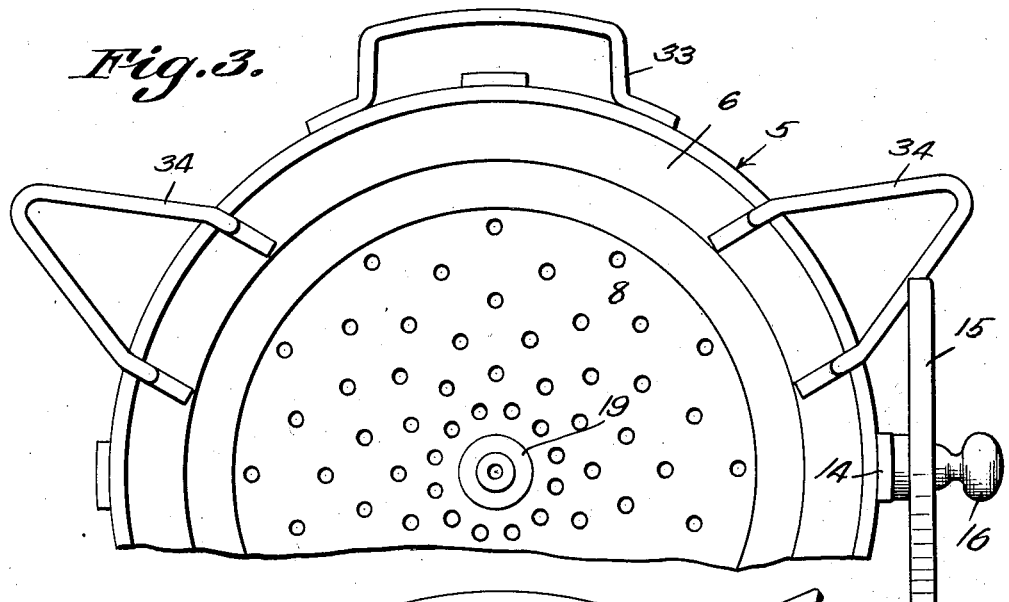
Fig. 3.
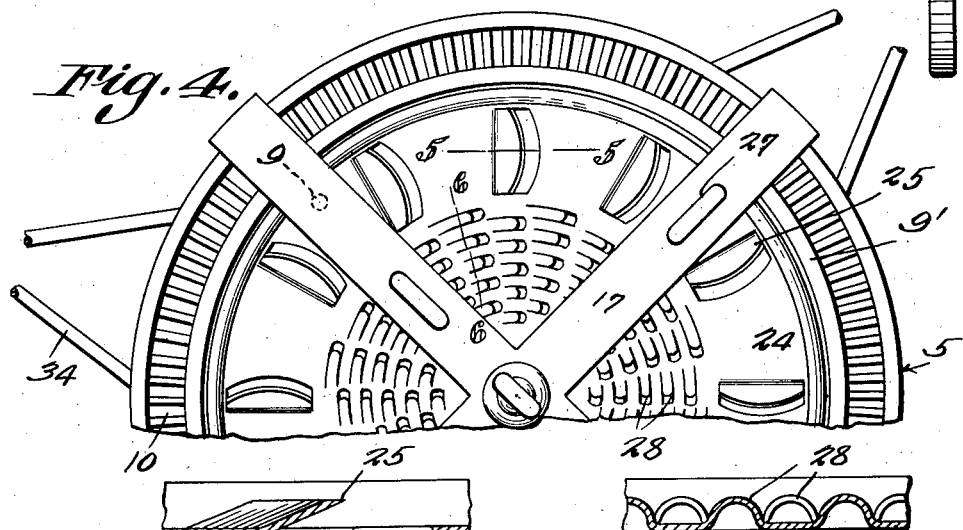
Fig. 4.
Fig. 5.　　　Fig. 6.
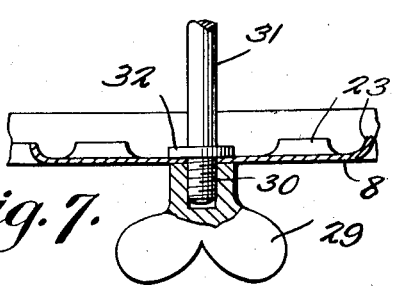
Fig. 7.
Inventor
A. L. Pace
By C. A. Snow & Co.
Attorneys.

Patented Apr. 27, 1937

2,078,507

UNITED STATES PATENT OFFICE 2,078,507

GRATER

Alfred L. Pace, Washington, D. C.

Application October 18, 1935, Serial No. 45,662

1 Claim. (Cl. 146—177)

This invention relates to fruit and vegetable graters and in particular to graters designed for kitchen and table use.

An important object of the invention is to provide a grater of this character wherein fruit and vegetables may be grated without the necessity of the operator touching the article during the grating operation, thereby eliminating any possibility of the operator cutting or scraping his hands by contact with the cutting surfaces of the grater.

Another object of the invention is to provide a grater which will grate substantially an entire article under treatment, thereby reducing waste to a minimum.

A still further object of the invention is the provision of means for automatically feeding the article to be grated to the movable grating member during the grating operation.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 3 is a fragmental bottom plan view of the grater.

Figure 4 is a fragmental plan view illustrating the device equipped with a modified form of grating member.

Figure 5 is a sectional view taken on line 5—5 of Figure 4.

Figure 6 is a sectional view taken on line 6—6 of Figure 4.

Figure 7 is a sectional view illustrating the means for securing the grater frame to the base of the grater.

Figure 1:
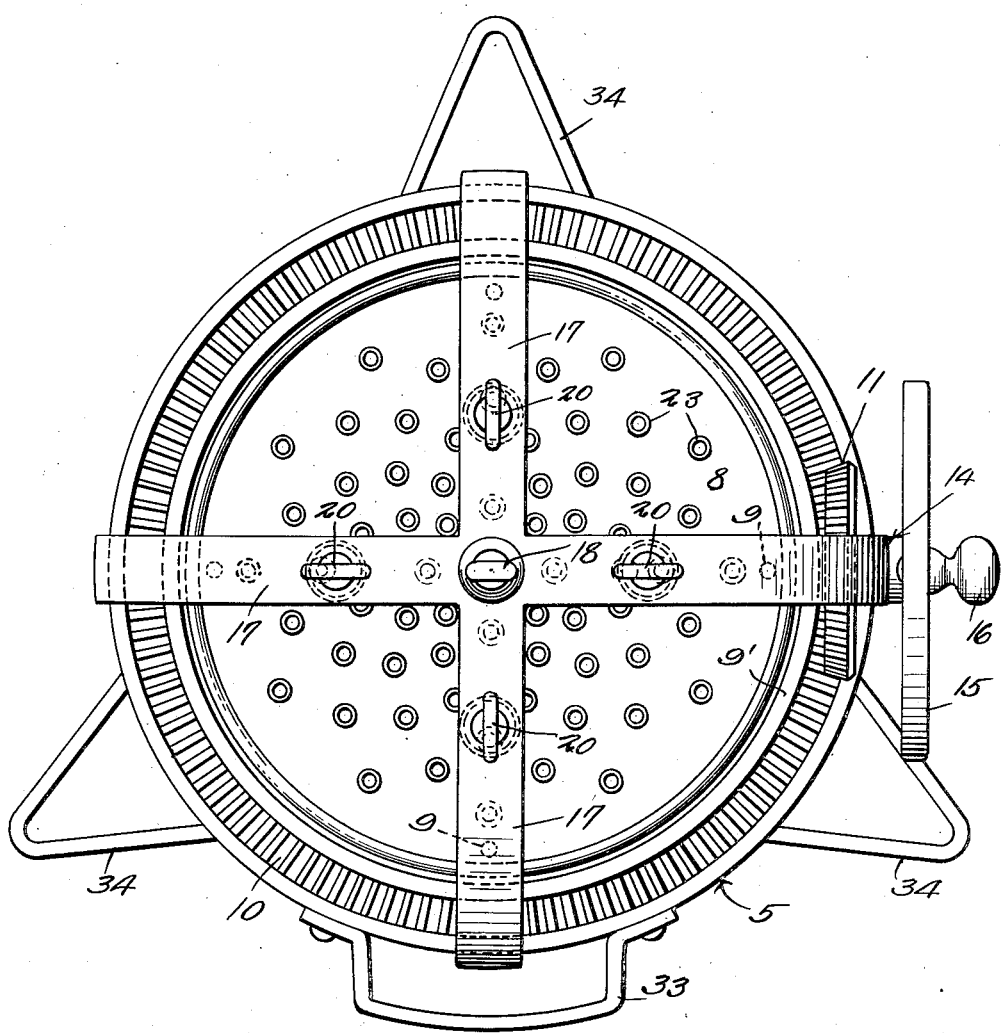
Figure 1 is a plan view of a fruit and vegetable grater constructed in accordance with the invention.

Referring to the drawings in detail:

The grater comprises a base indicated generally by the reference character 5, the base being preferably circular in formation and being provided with an inwardly extended annular flange 6 spaced from the upper edge of the base 5 and providing a support for the rotary member 7 that supports the grater 8. Lugs 9 extend upwardly from the rotary member 7 and pass into openings of the grater 8 securing the grater against movement with respect to the rotary member 7.

An upstanding flange 9 forms a part of the rotary member 7 and guards against the grated material passing laterally from the rotary member 7 or being thrown from the rotary member by centrifugal force. As clearly shown by the drawings, this rotary member 7 is formed with a ring gear 10, extending from the lower edge thereof, which ring gear is engaged by the teeth of the pinion 11 which is mounted on the inner end of the shaft 12, mounted in the bearing 13, forming part of the frame 14.

On the opposite end of the shaft 12, is a wheel 15 that carries the finger piece 16 whereby the operator may rotate the wheel 15 with the result that the gear 11 will operate the rotary member 7, to accomplish the purpose of the invention.

The frame 14 embodies upper bars 17 that have downwardly extended end portions connected with the base 5 supporting the upper bars in spaced relation with the base 5. Extending through an opening formed intermediate the ends of the upper bars 17, is a rod 18, that has its lower end threaded and fitted into the nut 19 secured to the grater 8, thereby holding the grater 8 in a true horizontal position at all times. The upper bars 17 also provide supports for the prongs 20 that pass through openings in the upper bars 17, the lengths of the prongs being such that the pointed ends thereof extend to positions in close proximity to the grater 8. These prongs 20 provide supports for the fruits or vegetables to be grated and are designed to be forced through the fruit or vegetables when putting the fruit or vegetables in position on the grater to be grated.

Washers 21 are mounted on the prongs 20 and contact with the fruit and vegetables being grated. Disposed between the washers and upper bars 17 are coiled springs 22 which are compressed when fruit or vegetables are positioned on the prongs with the result that the coiled springs act to normally urge the fruit or vegetables into engagement with the grater 8. Thus it will be seen that as the articles being grated are held by the prongs 20, they are automatically fed longitudinally of the prongs towards the lower ends thereof, hold the article in contact with the grater until substantially the entire article has been grated.

In order that the washers 21 will be restricted in their movements on the prongs, transverse pins 22 are provided and form stops against which the washers 21 engage.

Figure 2:
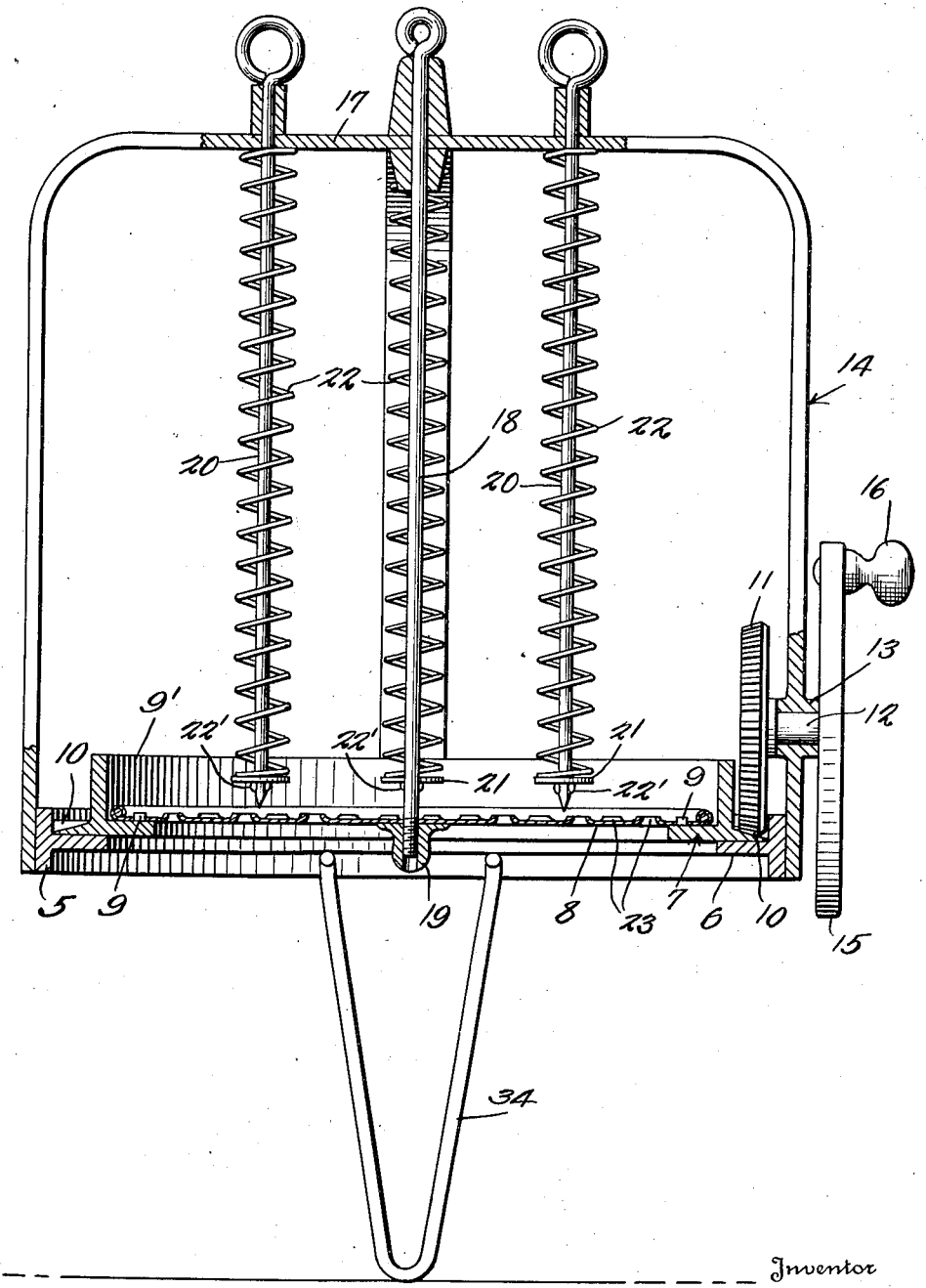
Figure 2 is a longitudinal sectional view through the grater.

The grater 8, in the form of the invention as shown by Figure 2 of the drawings, is in the form of a disc having grating surfaces 23 punched upwardly therefrom. As shown by Figure 4 of the drawings, the grating member indicated by the reference character 24 is constructed to provide slicing blades 25 with the result that the device may be employed in slicing fruits and vegetables. In this form of the invention prongs 27 extend through certain of the upper bars 17 of the device, and support the fruit or vegetable being sliced, directly over the blades 25.

Blades 28 also form a part of the grater 24 and are so constructed that when potatoes are fed thereto they will be sliced to form string potatoes.

In Figure 7, I have illustrated a modified form of grater securing means wherein a winged nut 29 is used on the thread end 30 of the rod 31, clamping the grating member between the disc 32 carried on the rod 31, and the winged nut 29.

In order that the device may be conveniently moved from place to place, handles 33 are provided and extend laterally from the body portion 5.

The body portion 5 is supported in spaced relation with the table or surface on which the grater is positioned, by means of the legs 34 to the end that a suitable dish or bowl may be positioned under the body portion to receive the grated material passing through the blades of the grater.

Having thus described the invention, what is claimed is:

A grater of the class described, comprising a base, an inwardly extended annular flange forming a part of the base, the flange being disposed below the upper edge of the base, a rotary member resting on the flange, a ring gear extending from the lower edge of the rotary member, a frame rising from the base, a pinion meshing with the gear and adapted to rotate the ring gear and rotary member, a spring pressed rod extending through the frame, a grating member secured to the lower end of the rod, lugs extending upwardly from the rotary member and extending into the grating member removably securing the grating member to the rotary member, and yieldable members on the frame adapted to hold articles being grated into engagement with the grating member.

ALFRED L. PACE.